(12) United States Patent
Nakanishi et al.

(10) Patent No.: US 6,216,018 B1
(45) Date of Patent: Apr. 10, 2001

(54) TELEPHONE HAND-FREE APPARATUS

(75) Inventors: Yukio Nakanishi, Kanagawa; Yasuhisa Nakahara, Tochigi; Yasuhiro Kobayashi, Gunma; Yoshihisa Takemori, Tochigi; Koichiro Haga, Tochigi; Kohei Hashimoto, Tochigi; Kazuhiko Fujimoto, Tochigi, all of (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 09/129,639

(22) Filed: Aug. 5, 1998

(30) Foreign Application Priority Data

Aug. 6, 1997 (JP) .................................. 9-224286
Nov. 26, 1997 (JP) .................................. 9-340686

(51) Int. Cl.⁷ .............................. H04B 1/38; H04M 1/00
(52) U.S. Cl. .................... 455/569; 455/557; 455/559; 455/90; 455/575; 455/570; 379/454; 379/455
(58) Field of Search .................... 455/569, 557, 455/559, 570, 90, 575, 212, 221, 301, 574; 379/420, 421, 454, 455

(56) References Cited

U.S. PATENT DOCUMENTS

| | | | |
|---|---|---|---|
| 4,715,062 | * 12/1987 | Korsky et al. | 379/390 |
| 5,239,586 | 8/1993 | Marui | 381/47 |
| 5,276,729 | 1/1994 | Higuchi et al. | 379/58 |
| 5,309,506 | * 5/1994 | Alexander | 379/95 |
| 5,333,176 | * 7/1994 | Burke et al. | 379/58 |
| 5,379,338 | * 1/1995 | Umemoto et al. | 379/58 |
| 5,475,872 | * 12/1995 | Sato | 455/89 |
| 5,535,433 | * 7/1996 | Kurokawa et al. | 455/79 |
| 5,659,594 | * 8/1997 | Toda | 455/552 |
| 5,664,014 | * 9/1997 | Yamaguchi et al. | 379/430 |
| 5,864,766 | * 1/1999 | Chiang | 455/572 |
| 5,867,768 | * 2/1999 | Onda | 455/66 |
| 5,978,689 | * 11/1999 | Tuoriniemi et al. | 455/569 |
| 5,983,100 | * 11/1999 | Johansson et al. | 455/426 |

FOREIGN PATENT DOCUMENTS 4-46747    4/1992  (JP) .
8-4767     2/1996  (JP) .

* cited by examiner

*Primary Examiner*—Lee Nguyen
*Assistant Examiner*—Marceau Milord
(74) *Attorney, Agent, or Firm*—Foley & Lardner

(57) ABSTRACT

A telephone hand-free apparatus comprises a housing; a telephone receiving case installed in the housing, the telephone receiving case being so sized and constructed as to receive therein a portable telephone; a board on which a control circuit is arranged, the board being installed in the housing; an external microphone operatively connected to the control circuit and exposed to the outside of the housing; an external speaker operatively connected to the control circuit and installed in the housing; a connection cable extending from the control circuit, so that when the connection cable is connected to a socket of the portable telephone, the external microphone and the external speaker become operative in place of a microphone and a speaker of the portable telephone; and an electric power source which energizes the control circuit. The control circuit includes a muting section which makes the external microphone inoperative while the control circuit is receiving a voice signal from the portable telephone through the connection cable.

20 Claims, 11 Drawing Sheets

TELEPHONE HAND-FREE APPARATUS

BACKGROUND OF THE INVENTION

1. Field of the Invention

The present invention relates in general to a radiotelephone such as a mobile telephone, and more particularly to a telephone hand-free apparatus which can use a portable telephone (viz., portable handset radiotelephone) as a hand-free telephone when having the portable telephone connected thereto. More specifically, the present invention is concerned with the telephone hand-free apparatuses of a type which exhibits excellent tone quality and excellent power saving.

2. Description of the Prior Art

Nowadays, mobile telephones are available for drivers seated in the motor vehicles. However, the use of a portable telephone (viz., portable handset radiotelephone) by the driver causes he or she to handle the steering wheel with one hand, which of course lowers the driving safety. In order to avoid such one hand handling, that is, in order to allow the driver to communicate with a person at the other end of the communication line without holding the portable telephone, various apparatuses have been proposed and put into practical use, some of which are of a so-called "telephone hand-free apparatus" which can use the portable telephone as a hand-free telephone when having the portable telephone connected thereto.

For ease of description, in the following, the person at the other end of the communication line will be referred to as the other person and a telephone used by the other person will be referred to as the other telephone.

Usually, the telephone hand-free apparatus is mounted in a vehicle cabin near the driver's seat, and comprises generally a case, a microphone mounted to the case for picking up a voice of the driver, a speaker installed in or mounted to the case for transmitting the other person's voice to the driver, a control circuit installed in the case for controlling operation of the microphone and the speaker, and a battery installed in the case for powering the microphone, speaker and control circuit.

However, due to inherent construction, the telephone hand-free apparatuses of the above-mentioned type tends to have the following drawbacks.

First, due to the close positioning between the speaker and the microphone, the telephone hand-free apparatus tends to produce uncomfortable howling when in use. That is, under communication between the driver and the other person, a voice produced by the speaker of the telephone hand-free apparatus is inevitably picked up by the microphone of the same and its voice signal is returned to the same speaker after making a round travel through the other telephone, and a voice thus produced by the speaker from the voice signal is picked up by the same microphone again, resulting in that the voice signal is forced to make repeated travels between the two telephone devices, which causes generation of ultra-high frequency sounds, that is, the uncomfortable howling. One measure for suppressing or at least minimizing such howling is proposed by Japanese Patent First Provisional Publication 5-14476. That is, in that measure, a howling or echo canceling unit is installed in the control circuit for reducing a loop gain of a first loop. However, as is known, such howling canceling unit is very complicated and expensive. Thus, if the unit is practically installed in the telephone hand-free apparatus, the cost of the apparatus becomes very increased.

Second, if the portable telephone is set close to the control circuit of the telephone hand-free apparatus, it often occurs that electromagnetic wave noises inevitably emitted from the portable telephone affect the control circuit and thus lower and deteriorate the tone quality of the telephone communication.

Third, in the hitherto proposed telephone hand-free apparatuses, power saving has been given little thought. Thus, the battery used in the apparatus tends to have a shorter life-time.

SUMMARY OF THE INVENTION

It is therefore an object of the present invention to provide a telephone hand-free apparatus which is free of the above-mentioned drawbacks.

That is, it is a first object of the present invention to provide a telephone hand-free apparatus which is free of uncomfortable howling when in use.

It is a second object of the present invention to provide a telephone hand-free apparatus which can provide the driver (or user) with the other person voice having an improved tone quality.

It is a third object of the present invention to provide a telephone hand-free apparatus which exhibits a higher power saving.

It is a fourth object of the present invention to provide a telephone hand-free apparatus which is economical.

According to a first aspect of the present invention, there is provided a telephone hand-free apparatus for use with a portable telephone which has a microphone and a speaker installed therein, the hand-free apparatus comprising a housing; a telephone receiving case installed in the housing, the telephone receiving case being so sized and constructed as to receive therein the handset radiotelephone; a board on which a control circuit is arranged, the board being installed in the housing; an external microphone operatively connected to the control circuit and exposed to the outside of the housing; an external speaker operatively connected to the control circuit and installed in the housing; a connection cable means extending from the control circuit, so that when the connection cable means is connected to a socket means of the portable telephone, the external microphone and the external speaker become operative in place of the microphone and the speaker of the portable telephone; and an electric power source which energizes the control circuit, wherein the control circuit includes a muting means which makes the external microphone inoperative while the control circuit is receiving a voice signal from the portable telephone through the connection cable means.

According to a second aspect of the present invention, there is provided a telephone hand-free apparatus for use with a portable telephone which has a microphone and a speaker installed therein. The telephone hand-free apparatus comprises a cylindrical housing; a telephone receiving case detachably installed in the cylindrical housing, the telephone receiving case being so sized and constructed as to detachably receive the portable telephone; a board on which a control circuit is arranged, the board being received in the cylindrical housing and connected to a part of the telephone receiving case; an external microphone operatively connected to the control circuit and exposed to the outside of the cylindrical housing; an external speaker operatively connected to the control circuit and installed in the cylindrical housing; a connection cable means extending from the control circuit, so that when the connection cable means is connected to a socket means of the portable telephone, the external microphone and the external speaker become operative in place of the microphone and the speaker of the portable telephone; a battery for energizing the control circuit; an electromagnetic wave shielding plate installed in the cylindrical housing in a manner to cover an exposed outer surface of the control circuit; and condensers through which a wire from the external microphone and wires of the connection cable means are connected to the shielding plate, wherein the control circuit includes a muting section which makes the external microphone inoperative while the control circuit is receiving a voice signal from the portable telephone through the connection cable means; and a power saving section which saves an electric power of the battery fed to the control circuit during the time when the portable telephone is in a stand-by condition.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
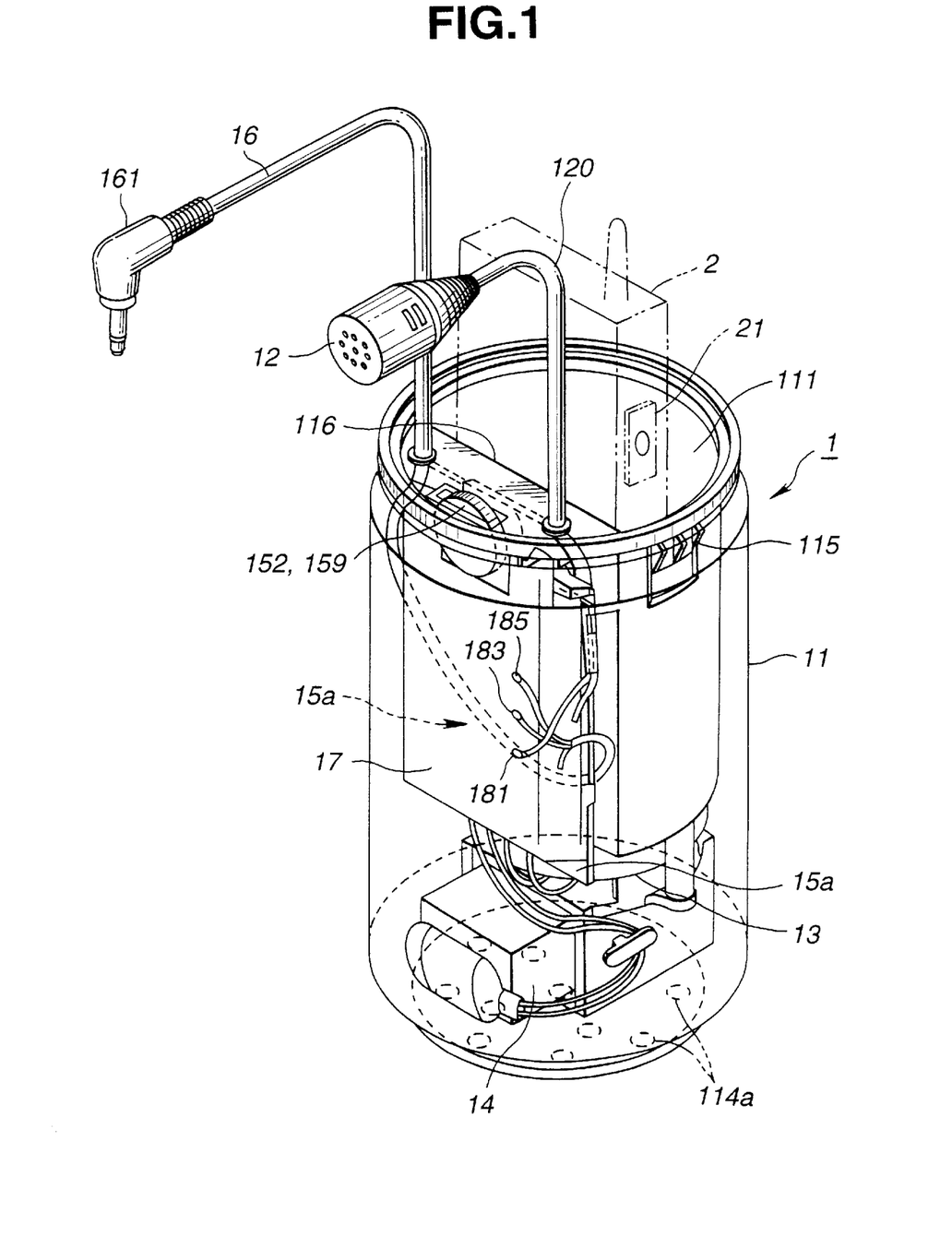
FIG. 1 is a perspective view of a telephone hand-free apparatus according the present invention.

Referring to FIGS. 1 to 10, particularly FIG. 1, there is shown a telephone hand-free apparatus according to the present invention, which is generally designated by numeral 1.

As is seen from FIG. 1, the apparatus 1 comprises a cylindrical housing 11 which has a telephone receiving case 111 detachably received therein. A circular bottom of the cylindrical housing 11 is formed with a plurality of small openings 114a. The telephone receiving case 111 is so sized and shaped as to receive therein a portable telephone 2 (viz., portable handset radiotelephone) as illustrated by a phantom line. More specifically, the telephone receiving case 111 has a semicircular cross section, that is, the telephone receiving case 111 has a vertically extending flat wall 116 by which the cylindrical interior of the housing 11 is divided into a larger semicircular space and a smaller semicircular space. Aluminum, steel, plastics, etc., may be used as a material of the housing 11. The telephone receiving case 111 is constructed of a molded plastic. A latch mechanism 115 is employed for detachably holding the case 111 in the housing 11. The cylindrical housing 11 illustrated is about 60 mm in diameter and about 120 mm in length.

As shown, a microphone 12 is mounted to a top of a rod like stand 120 which extends upward from the housing 11. Within the stand 120, there extend wires from the microphone 12. If desired, the stand 120 may be made of a flexible material so that the microphone 12 can take a desired position and orientation.

Figure 3:
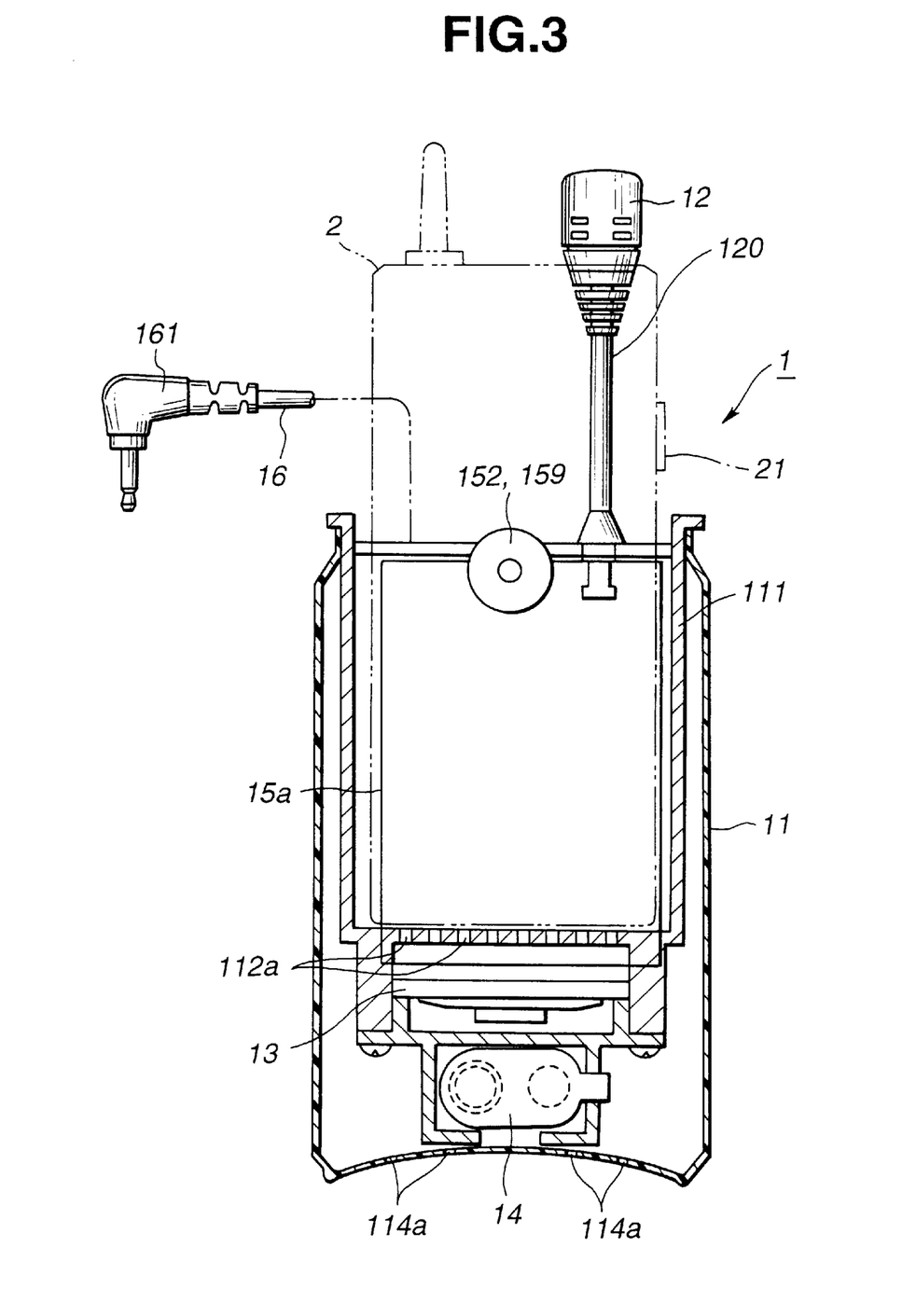
FIG. 3 is a vertically sectioned view of the telephone hand-free apparatus.
Figure 4:
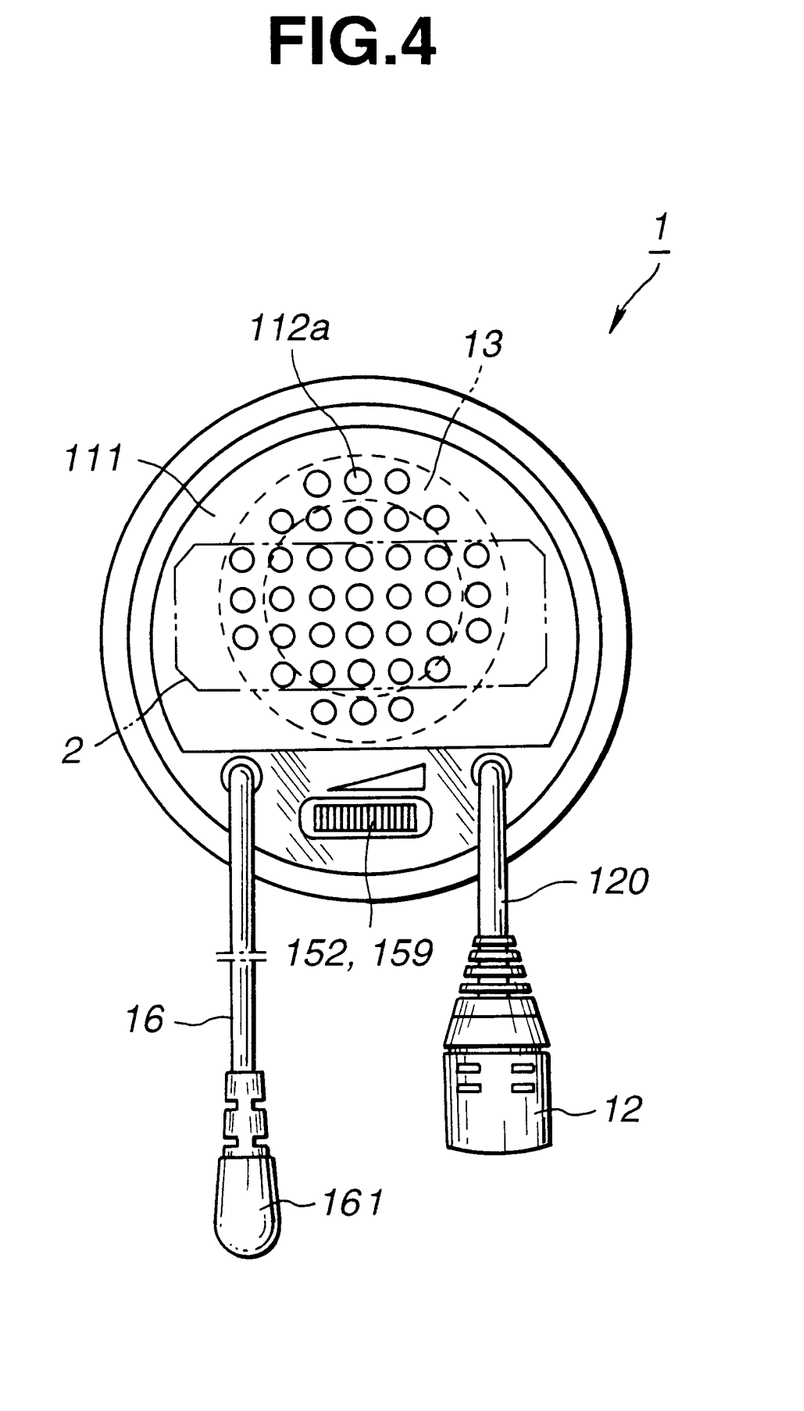
FIG. 4 is a plan view of the telephone hand-free apparatus.

As is seen from FIG. 3, a speaker 13 is fixed to a perforated lower portion 112a of the telephone receiving case 11 with its front face directed upward.

For ease of understanding, the microphone 12 and the speaker 13 will be referred to as "external microphone" and "external speaker" in the following.

As will become apparent as the description proceeds, the external microphone 12 picks up a voice of a driver when the portable telephone 2 is properly set in the apparatus 1 and in use.

Figure 5:
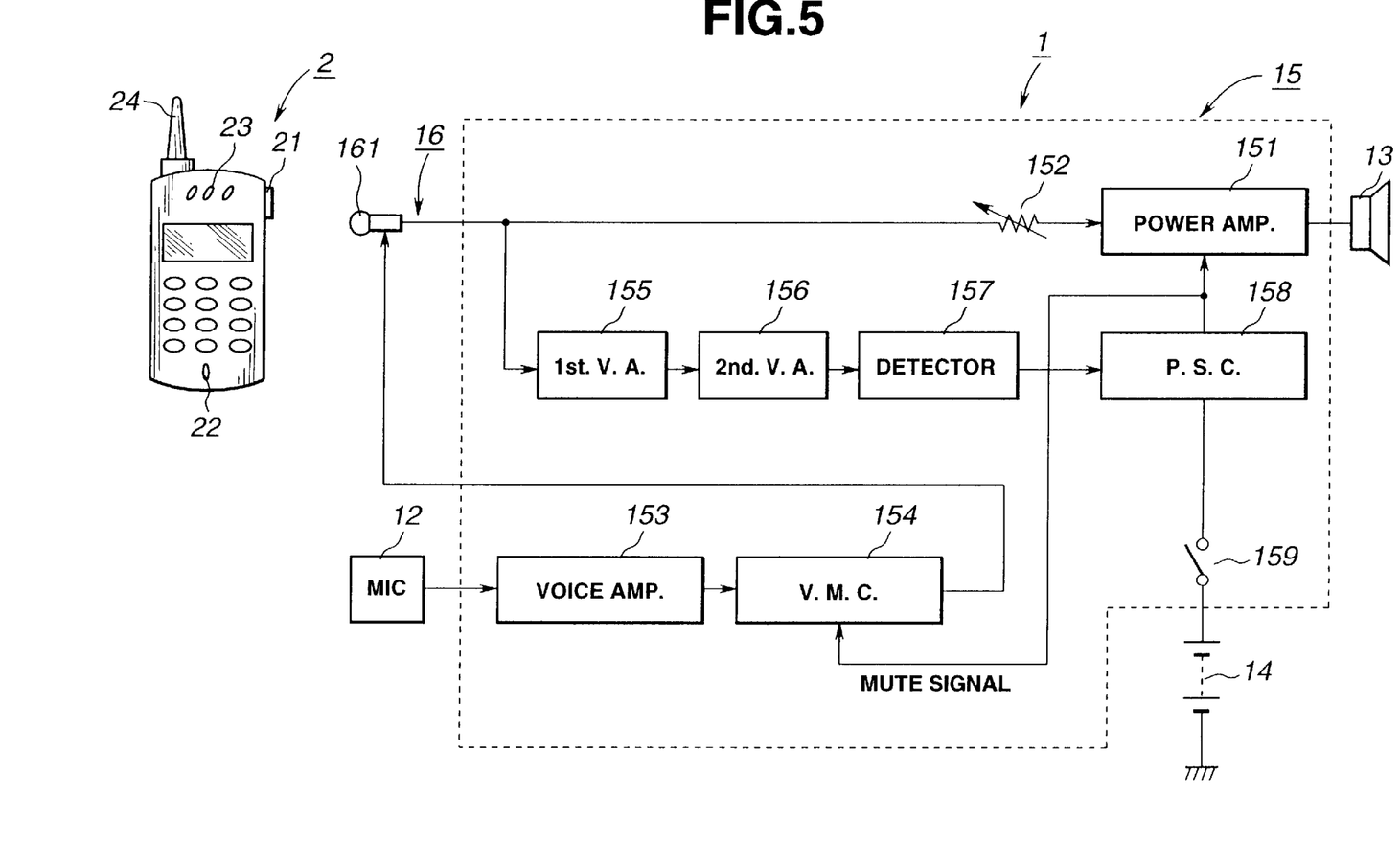
FIG. 5 is a block diagram of a control circuit employed in the telephone hand-free apparatus.

That is, as is seen from FIG. 5, when a 3P-plug 161 fixed to a cable 16 extending from the apparatus 1 is brought to connection with an input/output socket 21 of the portable telephone 2, a microphone 22 installed in the portable telephone 2 becomes inoperative and the external microphone 12 becomes operative in place of the microphone 22. That is, upon connection of the 3P-plug 161 with the socket 21, a voice of the driver is picked up by the external microphone 12, and a voice signal thus produced by the external microphone 12 is led to a voice amplifier 153 and a voice muting circuit 154 which are installed in a control circuit of the hand-free apparatus 1. The signal from the voice muting circuit 154 is led through the 3P-plug 161 into a control circuit installed in the portable telephone 2. After being treated by the control circuit, the voice signal is transmitted into air from an antenna 24 of the portable telephone 2.

As will become apparent as the description proceeds, the external speaker 13 loudly outputs a voice of the other person when the portable telephone 2 is properly set in the apparatus 1 and in use.

That is, as is seen from FIG. 5, when the 3P-plug 161 is brought into connection with the input/output socket 21 of the handset telephone 2, a speaker 23 installed in the portable telephone 2 becomes inoperative and, in place of the speaker 23, the external speaker 13 becomes operative. That is, upon the connection, a voice signal from the other telephone (viz., other person) is received by the antenna 24 and led into the control circuit of the portable telephone 2. After being treated by the control circuit, the voice signal is led through the input/output socket 21, the 3P-plug 161, a variable resistor 152 and a power amplifier 151 to the external speaker 13 to allow the external speaker 13 to produce the voice of the other person. Due to provision of the small openings 114a in the bottom of the housing 11, the voice produced by the external speaker 13 is smoothly and effectively led out to the outside from the housing 11. More specifically, due to the small openings 114a, lower frequency noises of the produced voice are removed, which improves the tone quality of the voice.

A series circuit including a first voice amplifier 155, a second voice amplifier 156 and a detector 157 is connected to a power switching circuit 158 whose output terminal is connected to the power amplifier 151.

As shown, the output terminal of the power switching circuit 158 is connected to the above-mentioned voice muting circuit 154 to feed the circuit 154 with a muting signal.

As is seen from FIG. 3, the telephone receiving case 111 has at its lowermost section a battery holder into which a battery 14 is detachably installed. A manual switch 159 is mounted on the case 111, which is connected to the battery 14 in series, as is seen from FIG. 5. The manual switch 159 is connected to the above-mentioned power switch circuit 158. The manual switch 159 and the above-mentioned variable resistor 152 are of a combination type. That is, in this type, an initial turning of a roller induces ON condition of the switch and further turning of the roller increases or reduces the resistance value of the resistor.

As the battery 14, dry and rechargeable batteries can be used. In case of using the rechargeable battery, a charging socket (not shown) may be fixed to the housing 11 near the battery 14. In this case, for charging the rechargeable battery, a charging plug extending from a cigarette lighter built in the vehicle cabin is brought into engagement with the charging socket. If desired, the charging plug may be directly connected to a control circuit 15 of the telephone hand-free apparatus 1 bypassing the battery 14. Of course, in this case, the battery 14 may be removed from the apparatus 1.

Figure 2:
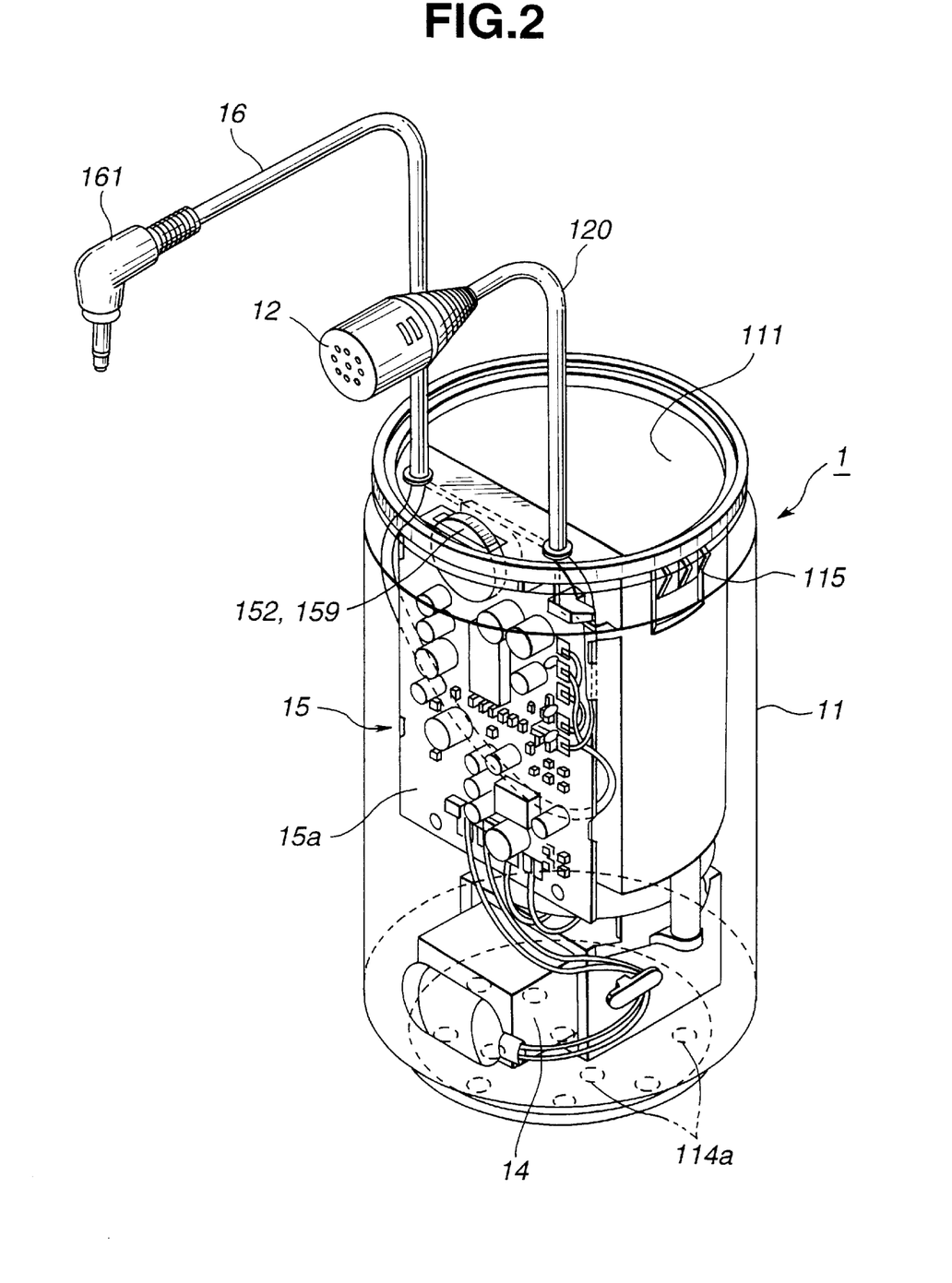
FIG. 2 is a perspective view of the telephone hand-free apparatus with an electromagnetic wave shielding plate removed.

As is seen from FIG. 2, the power amplifier 151, the power switch circuit 158, the first and second voice amplifiers 155 and 156, the detector 157, the voice amplifier 153 and the voice muting circuit 154 are all mounted on a control circuit board 15a which is installed in the cylindrical housing 11. More specifically, the control circuit board 15a is secured to the vertically extending flat wall 116 at a surface exposed to the smaller semicircular space.

In the present invention, the following measure is further employed.

That is, as is seen from FIG. 1, an electromagnetic wave shielding plate 17 is detachably installed in the cylindrical housing 11 in a manner to cover an exposed outer surface of the control circuit board 15a which is fixed to the vertically extending flat wall 116. Preferably, a snap action mechanism is employed for fitting the shielding plate 17 in the housing 11 in a snap action manner.

Figure 9A:
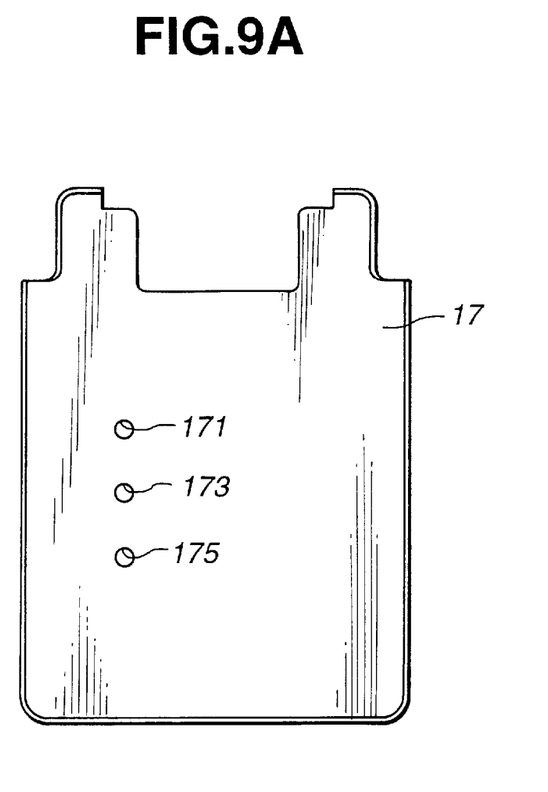
FIGS. 9A and 9B are front and side views of the shielding plate respectively.
Figure 9B:
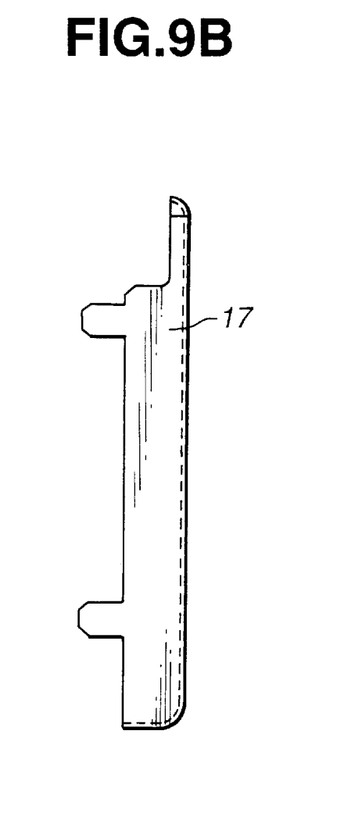

As is seen from FIGS. 9A and 9B, the shielding plate 17 is substantially rectangular in shape. The shielding plate 17 is constructed of an electromagnetic wave shielding material, such as an aluminum or the like. If desired, the shielding plate 17 is lined or coated with the electromagnetic weave shielding material. The shielding plate 17 is formed with three openings 171, 173 and 175 which are aligned as shown. As will become apparent as the description proceeds, each opening 171, 173 or 175 is constructed to constitute therein a so-called through type condenser 181, 183 or 185.

Figure 7:
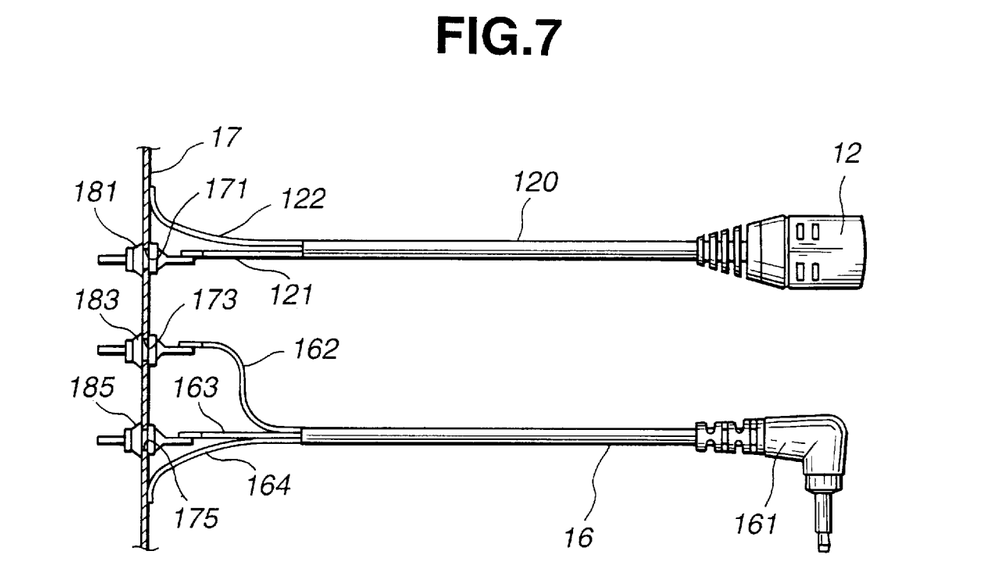
FIG. 7 is a sectional view of a portion of the telephone hand-free apparatus where cables for a microphone and a 3P-plug are connected to the shielding plate through condensers.

That is, as is seen from FIG. 7, one wire 121 extending from the external microphone 12 is soldered to the through type condenser 181, and the other wire 122 from the external microphone 12 is directly soldered to the shielding plate 17. Two wires 162 and 163 extending from the 3P-plug 161 are soldered to the through type condensers 183 and 185 respectively, and the other one wire 164 from the 3P-plug 161 is directly soldered to the shielding plate 17.

Figure 8:
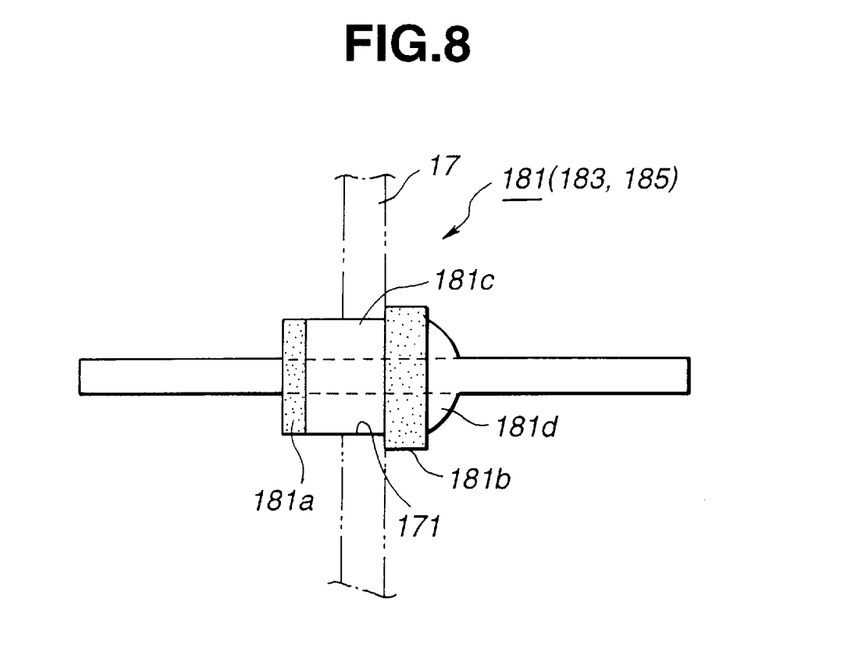
FIG. 8 is an enlarged sectional view of one of the condensers.

As is seen from FIG. 8, each through type condenser 181, 183 or 185 comprises two spaced ceramic layers 181a and 181b, a solder layer 181c interposed between the ceramic layers 181a and 181b and a terminal solder layer 181d soldered to the ceramic layer 181b. For fixing the condenser 181, 183 or 185 to the opening 171, 173 or 175, a certain heat is applied to the solder layer 181c by a soldering gun (not shown). With this, the solder layer 181c is melted and thus soldered to the opening 171, 173 or 175. Thereafter, the wire 121, 162 or 163 is soldered to the condenser 181, 183 or 185.

Figure 6:
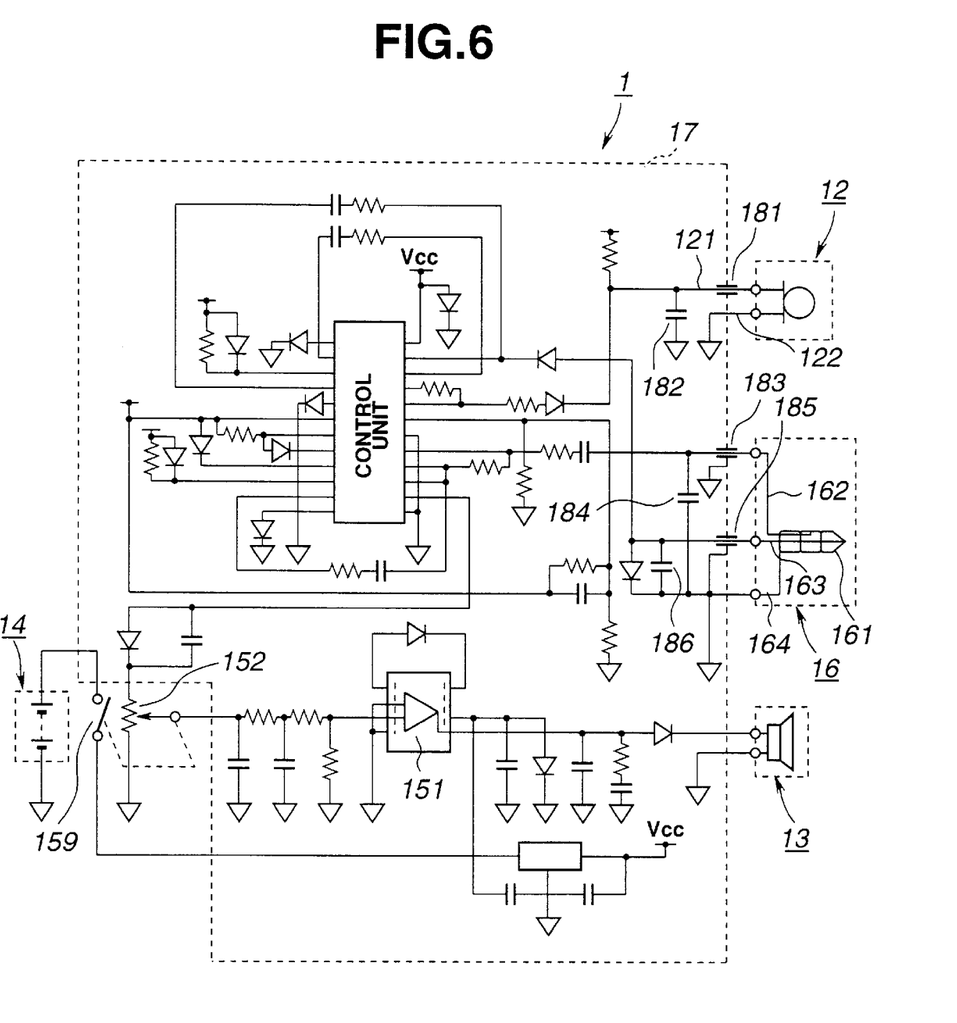
FIG. 6 is a detailed view of the control circuit of FIG. 5.

As is seen from FIG. 6, the 3P-plug 161 comprises a voice signal input terminal 162 (viz., wire), a voice signal output terminal 163 (viz., wire) and a grounding terminal 164 (viz., wire) which are aligned.

The voice signal input terminal 162 is connected to the control circuit 15 through the above-mentioned through type condenser 183. The control circuit 15 has therein a control unit consisting of a microcomputer. A voice signal from the portable telephone 2 through the input terminal 162 is adjusted by the variable resistor 152 and amplified by the power amplifier 151 before being outputted by the speaker 13.

That is, upon receiving the voice signal, the control unit issues ON signal to the power amplifier 151. If, under this condition, the manual switch 159 has been ON, a power of the battery 14 is practically applied to the power amplifier 151. That is, the control unit has the detector 157 installed therein for detecting the voice signal from the portable telephone 2. Due to provision of the detector 157, energization of the power amplifier 151 is effected only when the voice signal is led to the control circuit 15 from the portable telephone 2, which thus saves the power of the battery 14.

The input terminal 121 (viz., wire) of the external microphone 12 is connected to the control circuit 15 through the above-mentioned through type condenser 181. That is, when the manual switch 159 is turned ON, the external microphone 12 becomes operative to pick up a voice of the driver.

As is seen from FIG. 5, between the input terminal 121 of the external microphone 12 and the voice signal output terminal 163 of the 3P-plug 161, there is arranged the voice muting circuit 154. Due to function of this voice muting circuit 154, the voice signal from the external microphone 12 is suppressed from being applied to the voice signal output terminal 163 when the control circuit 15 is receiving a voice signal from the portable telephone 2. That is, during the time when the voice signal is being applied to the telephone hand-free apparatus 1, the external microphone 12 is kept inoperative. That is, during such time, the voice of other person emitted from the external speaker 13 is not practically picked up by the external microphone 12. This is very important to suppress the undesired howling phenomenon.

As is seen from FIG. 6, between the input terminal 121 and the grounding terminal 122 (viz., wire), there are arranged a condenser 182 in addition to the through type condenser 181. These condensers 181 and 182 function to remove undesired high frequency noises from the voice signal transmitted from the external microphone 12 to the control circuit 15 of the telephone hand-free apparatus 1. Furthermore, for the same purpose, between each of the input and output terminals 162 and 163 of the 3P-plug 161 and the grounding terminal 164 of the same, there are arranged condensers 184 and 186 in addition to the through type condensers 183 and 185.

As is known, the reactance of the condenser is inversely proportional to a frequency of a signal applied thereto and to a capacity of thereof. That is, with increase of the frequency of the signal, the reactance of the condenser becomes small. By practically using this fact, the high frequency noises can be removed. The condensers thus serve as a so-called low pass filter. The capacity of the condensers can be selected in accordance with the frequency which should be removed. In the frequency of portable telephones, the capacity of the condenser 181 to 186 is about 10 pF to 100 pF.

In the following, operation of the telephone hand-free apparatus 1 of the invention will be described with reference to the drawings.

Figure 10:
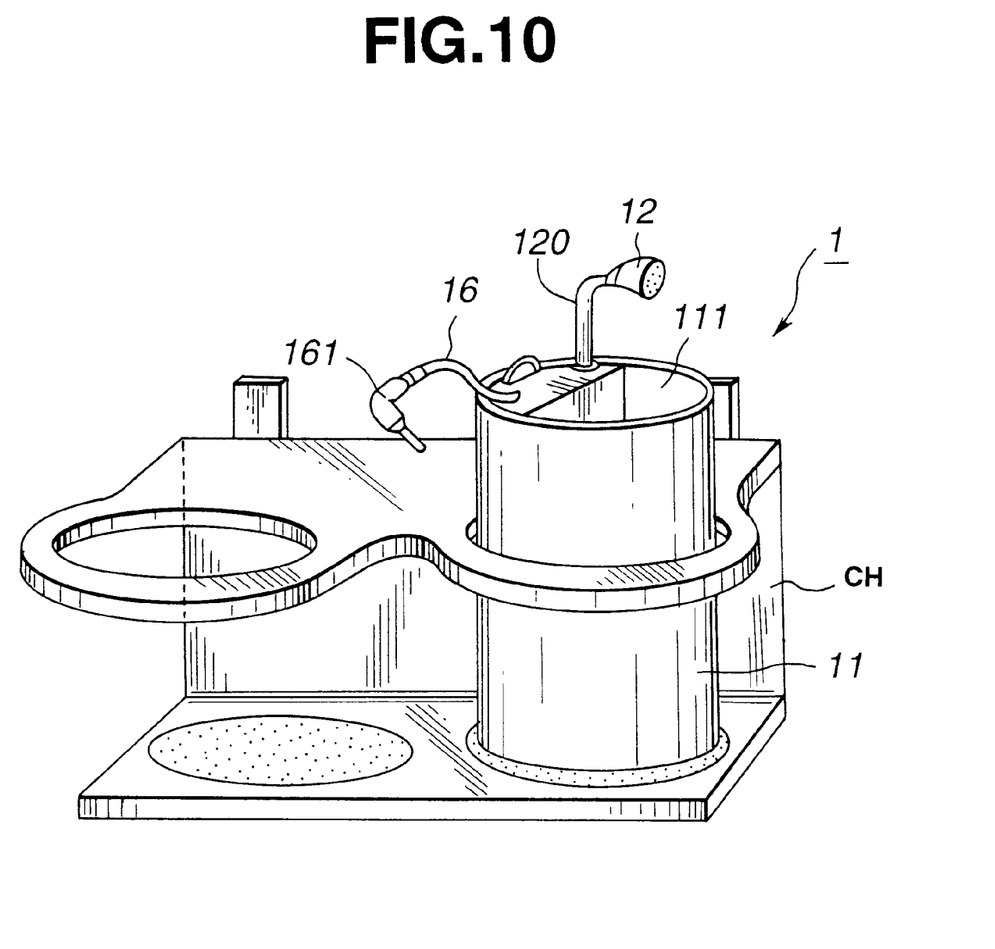
FIG. 10 is a perspective view of the telephone hand-free apparatus held in a known cup holder.

Usually, as is seen from FIG. 10, the hand-free apparatus 1 is held in a so-called can holder "CH" which is put on a dashboard (not shown) of a motor vehicle.

For ease of understanding, the description of operation will be commenced with respect to a stand-by condition of the portable telephone 2 wherein the portable telephone 2 in the hand-free apparatus 1 is ready for receiving a call from the other telephone. In this stand-by condition, the 3P-plug 161 of the apparatus 1 is kept connected to the input/output socket 21 of the portable telephone 2, and the manual switch 159 is kept ON. Thus, under this stand-by condition, the power of the battery 14 is kept applied to the control circuit 15 of the telephone hand-free apparatus 1.

When the portable telephone 2 in the hand-free apparatus 1 catches a call-signal of the other telephone through the antenna 24, the signal is treated by the control circuit of the portable telephone 2 and led to the control circuit 15 of the hand-free apparatus 1 through the input terminal 162 of the 3P-plug 161. With this, the control circuit 15 of the hand-free apparatus 1 forces the power of the battery 14 to be applied to the power amplifier 151 causing the external speaker 13 to produce a ring tone letting the driver know the telephone call.

When the driver pushes a communication start button (not shown) provided on the portable telephone 2, the control circuit 15 of the hand-free apparatus 1 establishes a telephone communication line between the portable telephone 2 and the other telephone. The external microphone 12 thus becomes ready for picking up the voice of the driver, and thus the driver can transmit his or her voice to the other person.

When a voice signal from the other telephone is received by the hand-free apparatus 1 through the portable telephone 2, the external microphone 12 becomes inoperative. That is, during the time when, due to ON condition of the power amplifier 151, the voice of the other person is being issued from the external speaker 13, the external microphone 12 does not pick up any sound. Thus, uncomfortable howling phenomenon is suppressed. The voice level of the other person outputted from the external speaker 13 can be adjusted by manipulating the variable resistor 152. When the external speaker 13 ceases talking, the external microphone 12 becomes operative. Under this condition, the voice of the driver can be transmitted to the other person.

When, under driving a motor vehicle, the driver wishes to make a telephone call to the other person, he or she must stop the motor vehicle for safety. Then the driver takes out the portable telephone 2 from the hand-free apparatus 1 and pushes telephone number buttons provided on the portable telephone 2. After finally pushing a transmission start button on the telephone 2, he or she puts the portable telephone 2 into the hand-free apparatus 1 and waits for a calling back from the other person. Of course, also in this case, during the time when the voice of the other person is being issued from the external speaker 13, the external microphone 12 is kept inoperative. Thus, undesired howling phenomenon is suppressed.

In the following, advantages of the telephone hand-free apparatus 1 of the present invention will be described.

First, due to the above-mentioned reason, the uncomfortable howling does not occur during the telephone communication.

Second, due to provision of the shielding plate 17 which covers the exposed outer surface of the control circuit 15, the control circuit 15 is protected from high frequency noises inevitably emitted from the portable telephone 2. Thus, the telephone communication is carried out with a higher tone quality. Furthermore, due to provision of the condensers 181, 182, 183, 184, 185 and 186 which are arranged in the above-mentioned manner, high frequency noises inevitably produced by the parts of the hand-free apparatus 1 and the portable telephone 2 are effectively removed. This improves the tone quality of the telephone communication. More specifically, the combination including the shielding plate 17 and the through type condensers 181, 183 and 185 operatively connected to the shielding plate 17 exhibits a high performance in shielding the control circuit 15 of the hand-free apparatus 1.

Figure 11:
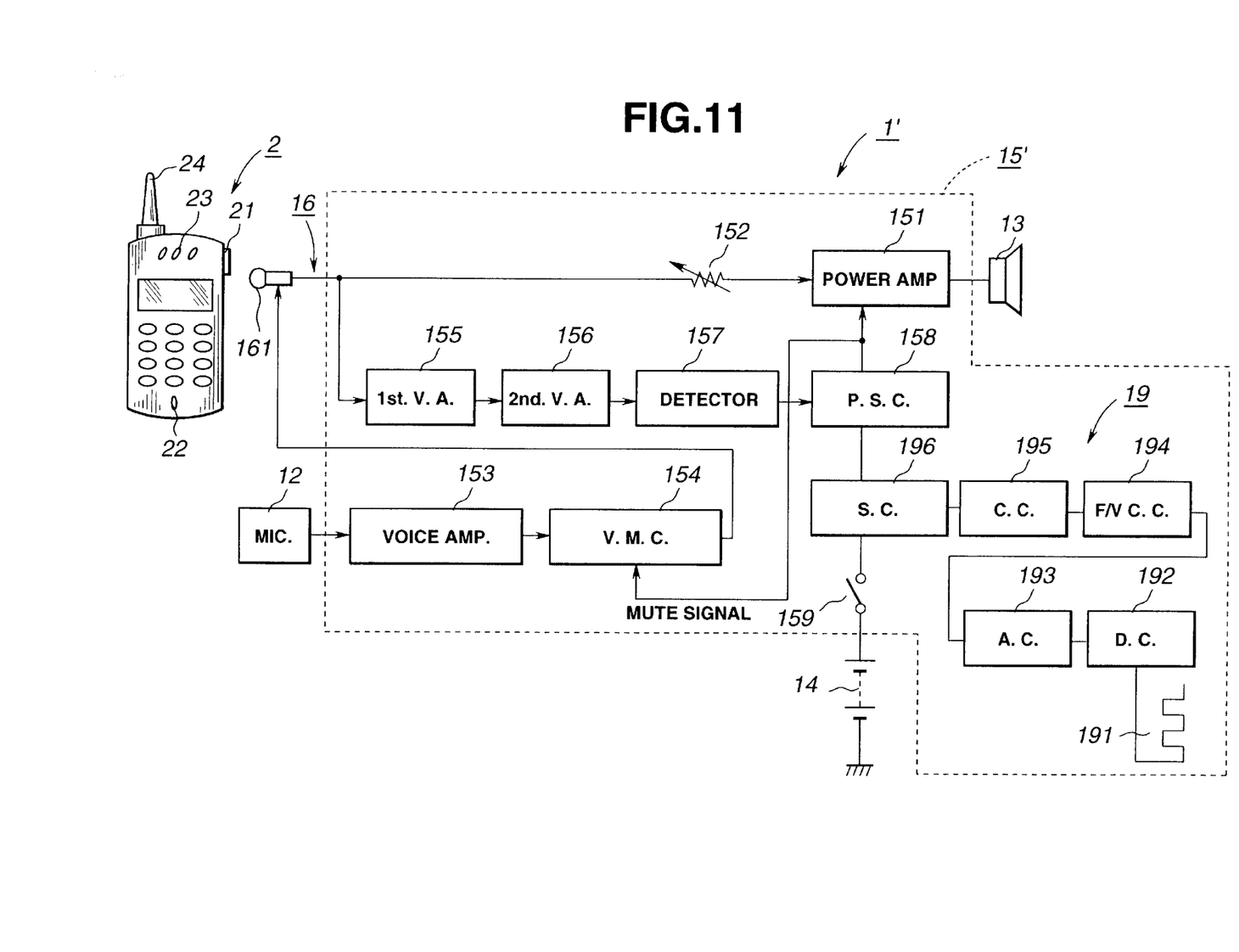
FIG. 11 is a block diagram of a control circuit which is employed in a modification of the telephone hand-free apparatus of the invention.
Figure 12:
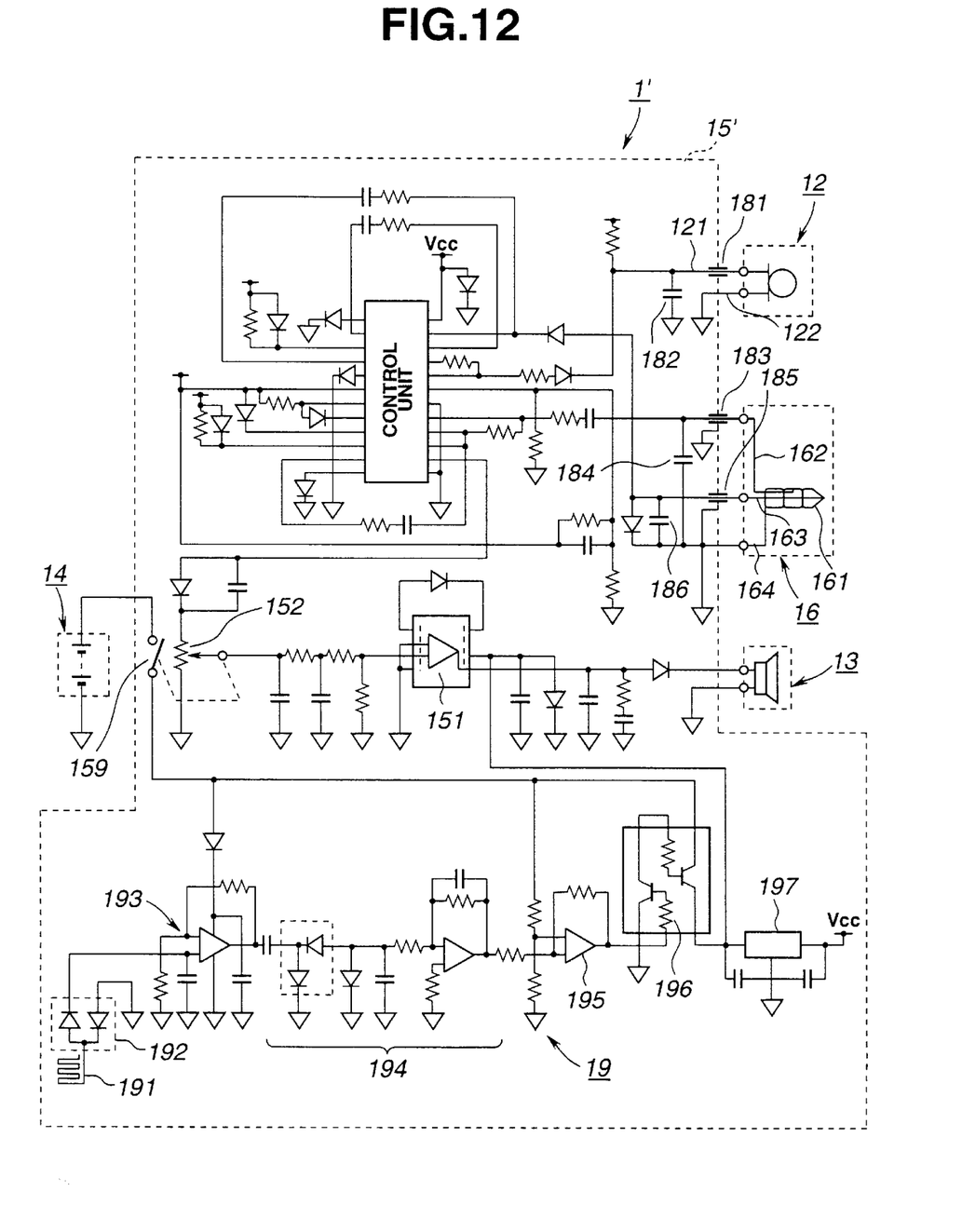
FIG. 12 is a detailed view of the control circuit of FIG. 11.

Referring to FIGS. 11 and 12, there is shown a control circuit 15' which is used in a modified telephone hand-free apparatus 1' of the invention.

As will become apparent as the description proceeds, in this modification 1', there is employed a power saving circuit 19 which can save an electric power of the battery 14 fed to the control circuit 15' during the time when the portable telephone 2 is in a stand-by condition.

As is seen from FIG. 11, the control circuit 15' employed in the modification 1' comprises a circuit which is substantially the same as the above-mentioned control circuit 15 and a power saving circuit 19.

The power saving circuit 19 comprises an antenna 191, a detector circuit 192, an amplifier circuit 193, a F/V converter circuit 194 (viz., frequency/voltage converter), a comparator circuit 195 and a switching circuit 196 which are connected in series in the illustrated manner. As shown, the switching circuit 196 is arranged between the above-mentioned manual switch 159 and the power switching circuit 158.

The antenna 191 is printed on the control circuit board 15a. It is to be noted that the shielding plate 17 has a cut through which the antenna 191 is exposed to the outside. The antenna 191 is arranged to receive an electromagnetic noise of 800 MHz or 1.5 GHz which is inevitably emitted when the portable telephone 2 is in use. Because the antenna 191 is provided on the control circuit board 15a, the antenna 191 can effectively receive such noise when the portable telephone 2 is put in the hand-free apparatus 1.

As is seen from FIG. 12, the detector circuit 192 comprises shot key barrier diodes (hot carrier diodes) which can be effectively used in an ultra high speed switching system. In fact, such diodes have very short ON/OFF turning time, and thus they can be used in the frequency range of VHF and/or microwave. The noise of the portable telephone 2 detected by the detector circuit 192 is amplified by the amplifier circuit 193 and then converted to a corresponding voltage by the F/V converter circuit 194. Then, the voltage is compared with a reference voltage at the comparator circuit 195.

When the voltage is determined higher than the reference voltage, a signal from the comparator circuit 195 makes the switching circuit 196 ON. Upon this, a switching regulator 197 (see FIG. 12) becomes operative. Thus, if the manual switch 169 has been kept ON, the power of the battery 14 is operatively applied to the control circuit 15' of the hand-free apparatus 1. While, when, by the comparator circuit 195, the voltage from the F/V converter circuit 194 is determined lower than the reference voltage, a signal form the comparator circuit 195 makes the switching circuit 196 OFF. In this case, the switching regulator 197 becomes inoperative.

Under this condition, the power of the battery 14 is not applied to the control circuit 15' of the hand-free apparatus 1 even when the manual switch 159 has been kept ON.

In the following, operation of the modification 1' of the invention will be described.

For ease of understanding, the description of operation will be commenced with respect to a stand-by condition of the portable telephone 2 wherein the telephone 2 in the hand-free apparatus 1' is ready for receiving a call from the other telephone. In this stand-by condition, the 3P-plug 161 of the apparatus 1' is kept connected to the input/output socket 21 of the portable telephone 2, and the manual switch 159 is kept ON.

It is now to be noted that under this stand-by condition, the switching regulator 197 is inoperative. Thus, the power of the battery 14 is not applied to the control circuit 15' (more specifically, to the power switching circuit 158) of the hand-free apparatus 1'. Thus, under the stand-by condition, power saving is achieved.

When the portable telephone 2 in the hand-free apparatus 1' catches a call-signal through the antenna 24, the telephone 2 inevitably issues the noise of 800 MHz or 1.5 GHz. The noise is picked by the antenna 191 and treated by the circuits 192, 193, 194 and 195 in the above-mentioned manner. In this case, the voltage from the F/V converter circuit 194 is determined higher than the reference voltage by the comparator circuit 195, and thus, the switching circuit 196 is turned ON making the switching regulator 197 operative. Upon this, the power of the battery 14 is applied to the control circuit 15' of the telephone hand-free apparatus 1'.

At the same time, the call-signal is treated by the control circuit of the portable telephone 2 and led to the control circuit 15' of the hand-free apparatus 1' through the input terminal 162 of the 3P-plug 161. With this, the control circuit 15' forces the power of the battery 14 to be applied to the power amplifier 151 to cause the external speaker 13 to produce a ring tone letting the driver know the telephone call.

When the driver pushes a catch button on the portable telephone 2, the control circuit 15' of the hand-free apparatus 1' establishes a telephone communication line between the portable telephone 2 and the other telephone. The external microphone 12 thus becomes ready for picking up the voice of the driver, and thus, the driver can transmit his or her voice to the other person.

When a voice signal from the other telephone is received by the hand-free apparatus 1' through the portable telephone 2, the external microphone 12 becomes inoperative. Thus, uncomfortable howling phenomenon is suppressed also in the modification 1'. That is, when the external speaker 13 ceases talking, the external microphone 12 becomes operative. Under this, the voice of the driver can be transmitted to the other person.

Since the work for making a telephone call to the other person is substantially the same as that of the above-mentioned hand-free apparatus 1, the description of such work will be omitted.

As is described hereinabove, in the modification 1' of the invention, effective power saving is achieved in the stand-by condition of the portable telephone 2 in addition to the advantages possessed by the above-mentioned hand-free apparatus 1.

It is to be understood that, although the invention has been described with specific reference to a particular embodiment thereof, it is not to be so limited since changes and alternations therein may be made within the full intended scope of this invention as defined by the appended claims.

What is claimed is:

1. A telephone hand-free apparatus for use with a portable telephone which has a microphone and a speaker installed therein, said hand-free apparatus comprising:
   a cylindrical can;
   a telephone receiving case installed in said cylindrical can, said telephone receiving case being so sized and constructed as to receive therein said portable telephone;
   a board on which a control circuit is arranged, said board being installed in said cylindrical can;
   an external microphone operatively connected to said control circuit and exposed to the outside of said cylindrical can;
   an external speaker operatively connected to said control circuit and installed in said cylindrical can;
   a connection cable means extending from said control circuit, so that when said connection cable means is connected to a socket means of said portable telephone, said external microphone and said external speaker become operative in place of the microphone and the speaker of said portable telephone; and
   an electric power source which energizes said control circuit,
   wherein said control circuit includes a muting section which makes said external microphone inoperative while said control circuit is receiving a voice signal from said portable telephone through said connection cable means.

2. A telephone hand-free apparatus as claimed in claim 1, further comprising an electromagnetic wave shielding plate which is installed in said cylindrical can in a manner to cover an exposed outer surface of said control circuit.

3. A telephone hand-free apparatus as claimed in claim 2, further comprising condensers through which a wire from said external microphone and wires of said connection cable means are connected to said shielding plate.

4. A telephone hand-free apparatus as claimed in claim 3, in which said condensers are of a through type condenser.

5. A telephone hand-free apparatus as claimed in claim 4, in which said shielding plate is formed with a plurality of openings which put therein said condensers respectively.

6. A telephone hand-free apparatus as claimed in claim 1, in which said electric power source is a battery installed in said cylindrical can.

7. A telephone hand-free apparatus as claimed in claim 6, further comprises a power saving section which is installed in said control circuit, said power saving section saving an electric power of the battery fed to said control circuit during the time when the portable telephone is in a stand-by condition.

8. A telephone hand-free apparatus as claimed in claim 7, in which said power saving section closes a connection between said battery and a power switching circuit of said control circuit when said portable telephone generates a certain magnitude of electromagnetic noise.

9. A telephone hand-free apparatus as claimed in claim 8, in which the frequency of said electromagnetic noise generated by said portable telephone is 800 MHz or 1.2 GHz.

10. A telephone hand-free apparatus as claimed in claim 8, in which said power saving section comprises an antenna, a detector circuit, an amplifier circuit, a F/V converter circuit, a comparator circuit and a switching circuit which are connected in series, said switching circuit being interposed between said battery and said power switching circuit.

11. A telephone hand-free apparatus as claimed in claim 10, in which said antenna is printed on the control circuit board.

12. A telephone hand-free apparatus as claimed in claim 1, in which said muting section blocks an electric connection between said external microphone and a control circuit of said portable telephone when receiving a muting signal from a power switching circuit which energizes a power amplifier of said external speaker when energized by said electric power source.

13. A telephone hand-free apparatus as claimed in claim 12, further comprising a manual switch which is arranged between said electric power source and said power switching circuit.

14. A telephone hand-free apparatus as claimed in claim 1, in which said cylindrical can has a circular bottom formed with a plurality of openings.

15. A telephone hand-free apparatus as claimed in claim 14, in which said telephone receiving case is detachably held in said cylindrical can by means of a latch mechanism.

16. A telephone hand-free apparatus as claimed in claim 15, in which the control circuit board is secured to an outer surface of a vertically extending flat wall which constitutes part of the telephone receiving case.

17. A telephone hand-free apparatus as claimed in claim 16, in which said telephone receiving case is formed at a lower section thereof with a battery holder in which a battery is detachably held.

18. A telephone hand-free apparatus as claimed in claim 14, in which said external microphone is fixed to a top of a rod-like flexible stand which extends upward from said cylindrical can.

19. A telephone hand-free apparatus as claimed in claim 14, in which said connection cable means comprises:
   a cable extending from said control circuit; and
   a 3P-plug connected to a leading end of said cable, said 3P-plug being detachably connectable to an input/output socket mounted on said portable telephone.

20. A telephone hand-free apparatus for use with a portable telephone which has a microphone and a speaker installed therein, said telephone hand-free apparatus comprising:

a cylindrical housing;

a telephone receiving case detachably installed in said cylindrical housing, said telephone receiving case being so sized and constructed as to detachably receive said portable telephone;

a board on which a control circuit is arranged, said board being received in said cylindrical housing and connected to a part of said telephone receiving case;

an external microphone operatively connected to said control circuit and exposed to the outside of said cylindrical housing;

an external speaker operatively connected to said control circuit and installed in said cylindrical housing;

a connection cable means extending from said control circuit, so that when said connection cable means is connected to a socket means of said portable telephone, said external microphone and said external speaker become operative in place of the microphone and the speaker of said portable telephone;

a battery for energizing said control circuit;

an electromagnetic wave shielding plate installed in said cylindrical housing in a manner to cover an exposed outer surface of said control circuit; and condensers through which a wire from said external microphone and wires of said connection cable means are connected to said shielding plate, wherein said control circuit includes:
   a muting section which makes said external microphone inoperative while said control circuit is receiving a voice signal from said portable telephone through said connection cable means; and
   a power saving section which saves an electric power of the battery fed to said control circuit during the time when the portable telephone is in a stand-by condition.

* * * * *